(No Model.) 8 Sheets—Sheet 1.
J. H. GUEST.
CHECK REGISTER.

No. 373,397. Patented Nov. 15, 1887.

Fig. 1.

WITNESSES:
Gabriel J. W. Galster.
Wm. H. Capel.

INVENTOR
J. H. Guest
BY
H. C. Townsend
ATTORNEY

(No Model.) 8 Sheets—Sheet 3.

J. H. GUEST.
CHECK REGISTER.

No. 373,397. Patented Nov. 15, 1887.

WITNESSES:
Gabriel J. W. Galster
Wm. H. Capel

INVENTOR
J. H. Guest
BY
H. S. Townsend
ATTORNEY

(No Model.) 8 Sheets—Sheet 4.

J. H. GUEST.
CHECK REGISTER.

No. 373,397. Patented Nov. 15, 1887.

WITNESSES:
Gabriel J. W. Galster
Wm. H. Capel

INVENTOR
J. H. Guest
BY H. C. Townsend
ATTORNEY

N. PETERS, Photo-Lithographer, Washington, D. C.

(No Model.)

J. H. GUEST.
CHECK REGISTER.

No. 373,397.   Patented Nov. 15, 1887.

WITNESSES:
Gabriel J. W. Galster.
Wm. H. Capel.

INVENTOR
J. H. Guest,
BY H. G. Townsend
ATTORNEY (No Model.) 8 Sheets—Sheet 7.

J. H. GUEST.
CHECK REGISTER.

No. 373,397. Patented Nov. 15, 1887.

WITNESSES:
INVENTOR
BY
ATTORNEY (No Model.) 8 Sheets—Sheet 8.
J. H. GUEST.
CHECK REGISTER.

No. 373,397. Patented Nov. 15, 1887.

WITNESSES:
Gabriel J. W. Galster.
Wm. H. Capel.

INVENTOR
J. H. Guest,
BY
H. C. Townsend
ATTORNEY

UNITED STATES PATENT OFFICE.

JOHN H. GUEST, OF BROOKLYN, ASSIGNOR OF ONE-HALF TO T. FRED THOMAS, OF NEW YORK, N. Y.

CHECK-REGISTER.

SPECIFICATION forming part of Letters Patent No. 373,397, dated November 15, 1887.

Application filed March 9, 1886. Serial No. 194,612. (No model.)

*To all whom it may concern:*

Be it known that I, JOHN H. GUEST, a citizen of the United States, and a resident of Brooklyn, in the county of Kings and State of New York, have invented certain new and useful Check-Registers, of which the following is a specification.

My invention relates to that class of apparatus sometimes termed "check-registers," and that consist, essentially, of a holder or series of holders for checks of various values or denominations, combined with a means for removing the checks and with a registering mechanism in such way that a check cannot be obtained without producing a corresponding operation of the register. Apparatus of this general nature, designed for use on horse and elevated railroads, and in stores, barrooms, places of amusement, &c., as a check upon the dishonesty of employés, has been hitherto devised in various forms.

My invention is designed more particularly to furnish an apparatus of simple construction and great efficiency in which the checks or other tokens or evidence of value shall be printed as they are required, the operation of the apparatus for the purpose of printing and delivering the check being attended with a necessary concomitant operation of the register that shows the numbers and total value of the checks or tickets used.

My apparatus is intended especially for use at the stations of elevated railways or similar institutions by the ticket agent, whose duty it is to receive fares and to deliver tickets to passengers, to be by them deposited in a receiving-box at the entrance to the station-platform, although the employment of the apparatus in other situations and for analogous purposes is also contemplated by me, and many other applications of the invention will readily be suggested.

In order, however, to explain and illustrate the invention more conveniently, I shall describe it as constructed and arranged for use at a station of an elevated railway.

My invention involves, generally speaking, the following parts:

First. A means for printing the tickets under the control of the station-agent or other person who is required to deliver the tickets or checks. This apparatus I propose to construct in such way that the tickets shall be printed by the decomposing action of electricity upon chemically-prepared paper. Such a printer may be termed an "electro-chemical printer," and it involves, under ordinary circumstances, the employment of slightly-moistened paper. The ticket is printed in any design by passing the paper between two metallic surfaces, one of which is plain, while the other bears in relief the characters or figures which it is designed that the ticket should bear. These surfaces are preferably two wheels, between which the paper or other material is fed. By this mechanism tickets or other matter may be printed with great rapidity. The impressions or design may be made indelible by using a suitable chemical composition for heating the paper. I prefer, however, to use a material which will give a fugitive imprint or mark which shall endure only for approximately the limited time that the ticket is required for legitimate use after it is withdrawn from the ticket printing and delivery apparatus, thus adding to the difficulty of using forged tickets or checks. A solution suitable for moistening the paper to give such fugitive imprint may be made from one-fourth pound iodide of potassium, one pound bromide potassium, one-half ounce dextrine, and one-half gallon of distilled water with a little glycerine.

The parts between which the paper passes in receiving the imprint might be of any other form; but it is desirable that the part opposite the plate having the raised printing-character or the design, and to which the electric current passes from the design-wheel and through the paper, be a flat surface, and that means be employed for holding the paper tightly against the character or design plate by the pressure of the flat surface or plate, or vice versa.

When it is desired, as is ordinarily the case, to keep a registry or a record of the operations of the printing and delivery apparatus, I prefer to employ one or more electric registers, one or more at least of which are placed at a central or supervising office, such as the company's office. This register is preferably operated by the current that does the printing, since the two operations are thus made more intimately interdependent—that is to say, the production of a ticket or check for use is necessarily attended by an operation of the register.

To add to the difficulty of fraudulently manipulating the apparatus, I place the generator at the central office or at some other remote point out of immediate reach of the person using the printing and delivery apparatus.

The circuit-controller by means of which the current is controlled so as to produce an operation of the register is of any desired kind, but is preferably made a part of the printing-surfaces themselves, or is otherwise placed in the printing-circuit. This can be readily done by dividing the printing-wheel or other surface into parts in the direction of the feed of the paper and insulating the said parts from one another, or, in other words, so constructing the printer that the obtaining of the impression shall be attended by a break and make of circuit.

The divisions of circuit-breaking portions of the printing surfaces or circuit are made to correspond to the character or value of the ticket or check, the apparatus for printing a five-cent ticket or check, for instance, being made to interrupt the circuit once for every ticket printed, and a ten-cent ticket to interrupt the circuit twice. It is obvious that the lower or negative surface might be subdivided instead of the positive or impression surface. It would be possible, also, to arrange the circuit-breakers at other points in the circuit, they being, however, so arranged as to act at an interrupted portion of the design for the tickets, so as not to mutilate the latter.

In addition to the matters already indicated, my invention consists in various means and combinations for facilitating the operation of the apparatus in printing and delivering checks or tickets of different denominations, for giving to the agent a control of the apparatus, so that when a batch of tickets at a reduced rate is sold a registry corresponding to the amount actually received for the tickets shall be produced instead of a registry according to the total face value of the tickets.

The invention also consists in a means whereby the indications of a number of registers at a central office may be readily and conveniently added in a grand total upon a single register.

The invention consists, further, in a mechanism operated by an electro-magnet for separating the printed tickets from one another when they are printed successively upon a continuous strip or ribbon fed through the printing-surfaces, and also in certain other details and combinations of devices, that will be more particularly described in connection with the accompanying drawings, in which—

Figure 1:
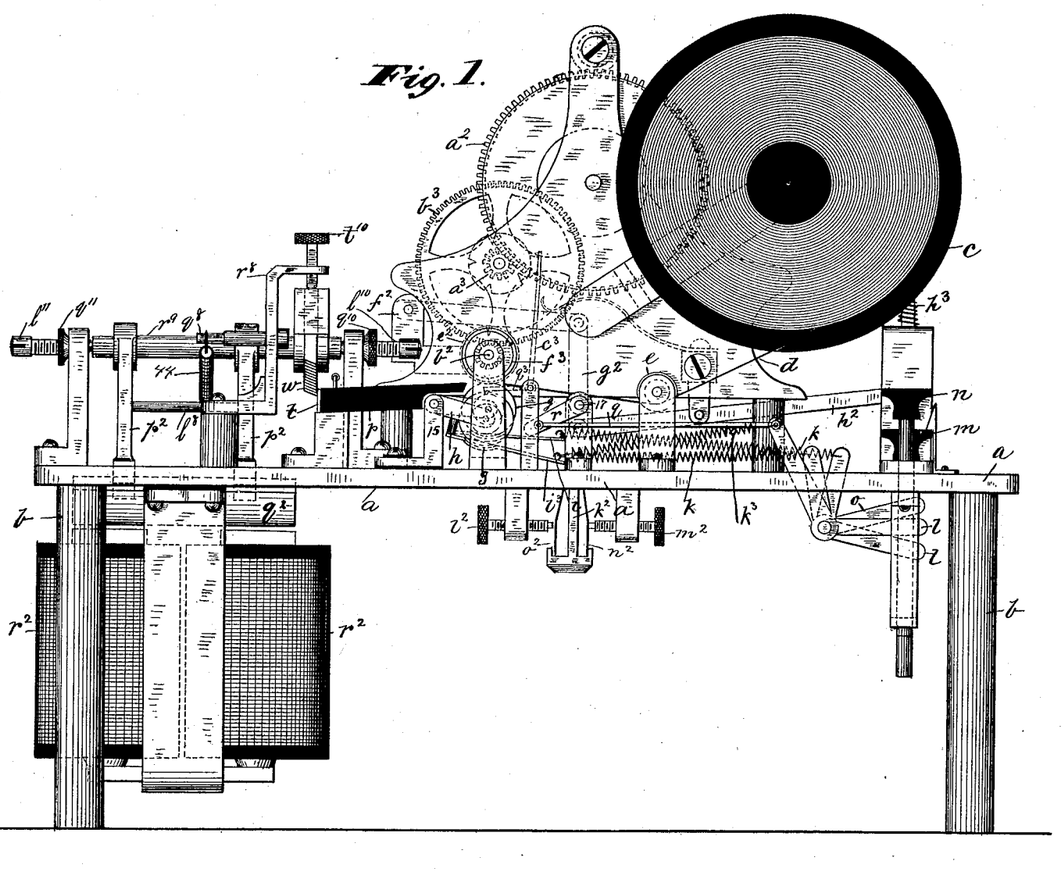
Figure 1 is a side elevation of an apparatus embodying my invention.
Figure 2:
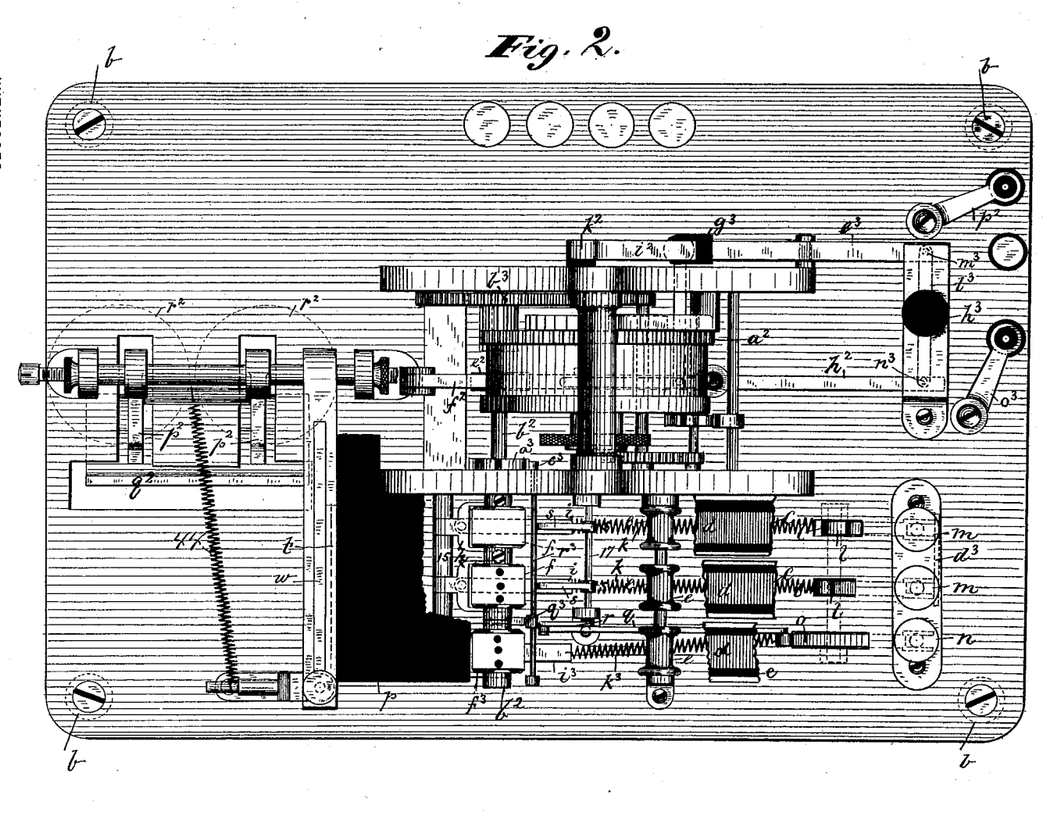
Fig. 2 is a plan of the same.
Figure 3:
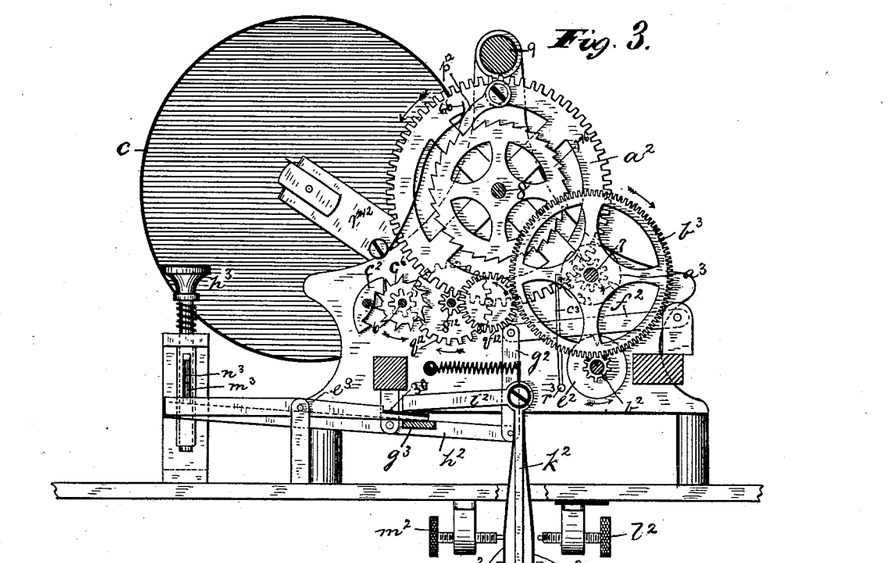
Fig. 3 is a rear elevation of a portion of the apparatus.
Figures 20, 21, 22:
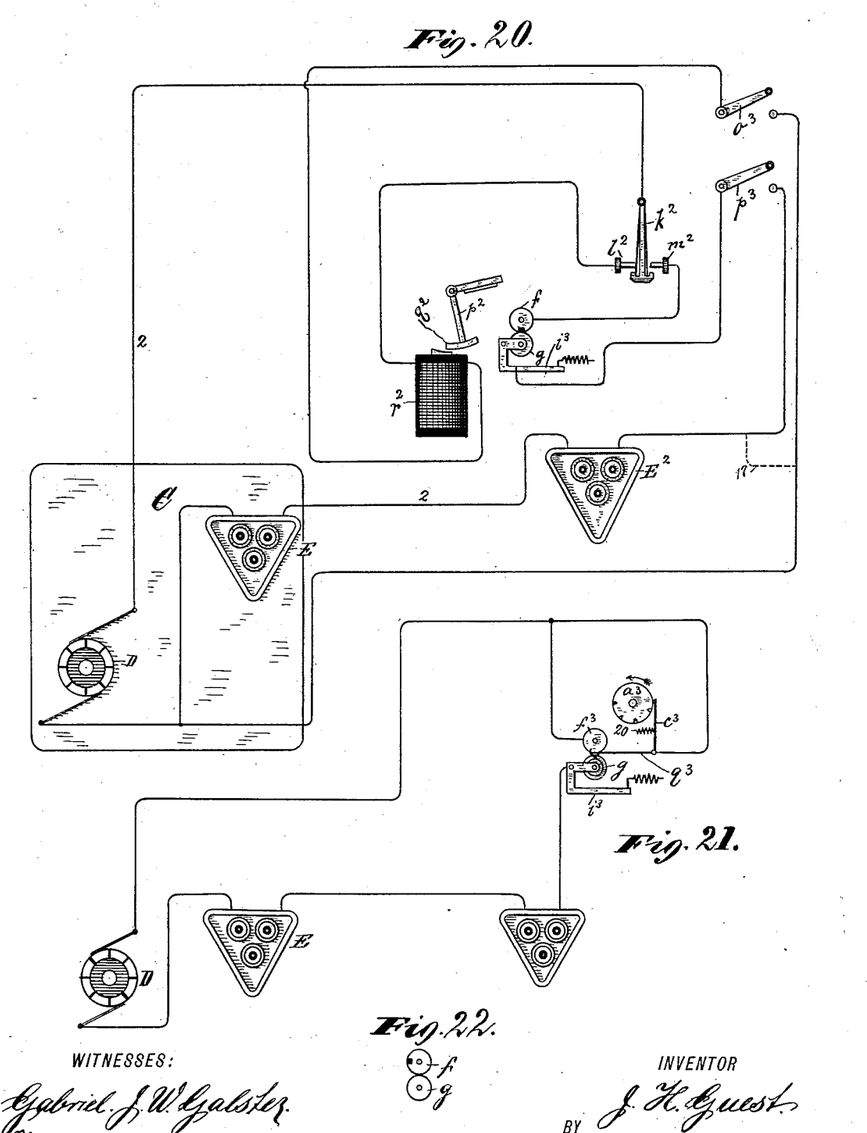
Fig. 20 is a diagram of circuits and connections.
Fig. 21 is a diagram of circuits and connections for a portion of the apparatus.
Fig. 22 illustrates a modification of a part of the invention.

The ticket printing and delivery apparatus is shown in Figs. 1, 2, 3, &c., and is connected over a circuit, 2 2, Fig. 20, with a central or supervising office, C—such, for instance, as the offices of the elevated railway—where are located any suitable generator of electricity (indicated at D) and a registering apparatus of a construction to be presently described (indicated at E.)

The generator D supplies the current for printing the tickets by the decomposing action of electricity and for operating the register E, which contains an operating or controlling magnet in the circuit 2 2.

The base of the ticket-printing apparatus, on which the various working parts are supported, is indicated at $a$, (see Fig. 1,) while at $b$ are indicated posts supporting said base.

It is desirable, of course, that a suitable inclosing-case should be provided and should be so arranged that the parts to which it is desired that the operator shall not have access may be kept under lock and key. I ordinarily prefer to arrange the parts so that the reels containing the paper to be printed may be replaced, when the paper is exhausted, by the operator himself. The circuits and connections to the device are, however, preferably placed out of his control. These are matters that can be readily arranged to suit circumstances, and I have omitted to show them in order to simplify the drawings and the description.

I have shown in the present instance three sets of printing-wheels, $f\ f\ f^3$, (see Fig. 2,) which are all secured upon a common shaft, $b^2$, driven by a spring-motor, the mainspring-wheel of which is indicated at $a^2$, while an escapement for retarding the action of the motor upon the shaft $b^2$ is indicated at $c^2$. (See Fig. 3.) The wheel $a^2$ is geared to the shaft $b^2$ through a wheel, $b^3$, in manner clearly shown in Fig. 3, and the shaft $b^2$ carries a stop-wheel, $e^2$, under the control of a stop-lever, $f^2$, that is operated in a manner to be presently described. The stop-wheel $e^2$ is provided with a notch in its face, and the stop-lever $f^2$ carries a corresponding tooth for engagement with the notch. When the lever is momentarily raised, the wheel $e^2$ is released and the motor turns the shaft $b^2$ and the printing-wheels, giving to the same a complete rotation, whereupon the lever $f^2$ drops back and engages the wheel $e^2$, stopping the motion. The wheels $f\ f\ f^3$ are of conducting material and carry upon their cylindrical surface in relief the design for printing the check or ticket. Electrical connection with said wheels and surfaces is made by attachment of the positive conducting-wire with the frame of the clock-work. These printing-surfaces might be in any form and the wheels of any construction that would permit the current from the positive pole of the generator to pass to the conducting-periphery bearing the design. The wheels $f\ f$ carry or are provided with suitably-formed surfaces for printing five and ten cent checks, respectively.

The wheel $f^3$ is designed for printing ten-cent checks when it is desired to print a number in succession—as, for instance, when twelve ten cent tickets are to be supplied for a dollar. Beneath each wheel, and borne upon a suitable lever, $h$, is a wheel of conducting material, $g$, or a wheel whose surface is of conducting material and whose supporting-lever is mounted in supports 15, supported on the plate $a$, but insulated therefrom. To these supports the negative conductor of the circuit is connected.

Extending from the levers or arms $h$, that carry the several wheels $g$, are arms $i\ i\ i^3$, (see Fig. 1,) which in turn are connected by springs $k\ k\ k^3$ with bell-crank levers $l\ l\ o$. The levers $l\ l$ are operated by push-buttons $m\ m$, which can be depressed at pleasure to put the springs $k\ k$, respectively, under tension, so as to raise either wheel $g$ and the proper strip of paper, $d$, resting thereon against a corresponding wheel, $f$.

Figure 9:
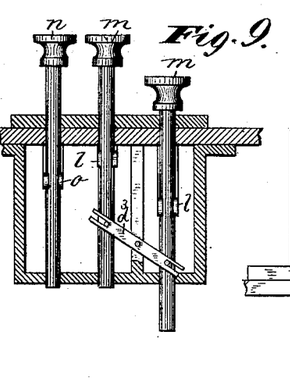
Fig. 9 represents the push-buttons whereby printing devices for various denominations of tickets may be brought into operative condition.

An intermediate lever, $d^1$, between the push-buttons $m\ m$ or the spindles for the same, is employed and arranged as shown in Fig. 9, so that the depression of one spindle to put the spring $k$ connected therewith under tension will automatically raise the other spindle and release the other spring $k$ from tension, so that by gravity the wheel $g$, operated by the latter, will drop away from its printing-wheel $f$.

The strip or strips of paper upon which the design or imprint for various classes of checks are made are carried by a number of reels, $c\ c$, suitably mounted. The paper is fed from these reels under rollers $e\ e$ and between the wheels $f\ g$ and onto a table, $p$, at the edge of which remote from the rollers is arranged a suitable cutting or separating apparatus, $w$, for dividing the strip of printed paper into separate checks or tickets.

The third button or spindle, $n$, operates on a bell-crank lever, $o$, that is connected by a link, $q$, with an arm, $r$, extending from a rock-shaft, 17. The latter carries two arms, $s\ s$, adapted to engage with the arms $i\ i$ when the button $n$ is depressed, so as to lower positively both wheels $g\ g$ and their paper strips out of contact with the rolls or printing-wheels $f\ f$. The spring $k^3$, connected with the bell-crank lever $o$ and with the arm $i^3$, extending from the lever $h$, that supports the wheel $g$, beneath the wheel $f^3$, serves to raise said wheel $g$ and the strip of paper resting thereon into contact with or against the wheel $f^3$ in an obvious manner.

It will be seen that by means of button $n$ both of the wheels $f\ f$ may be thrown out of action at the same time that wheel $f^3$ is thrown into action or operative condition for printing checks or tickets.

Figures 4, 5, 6, 7:
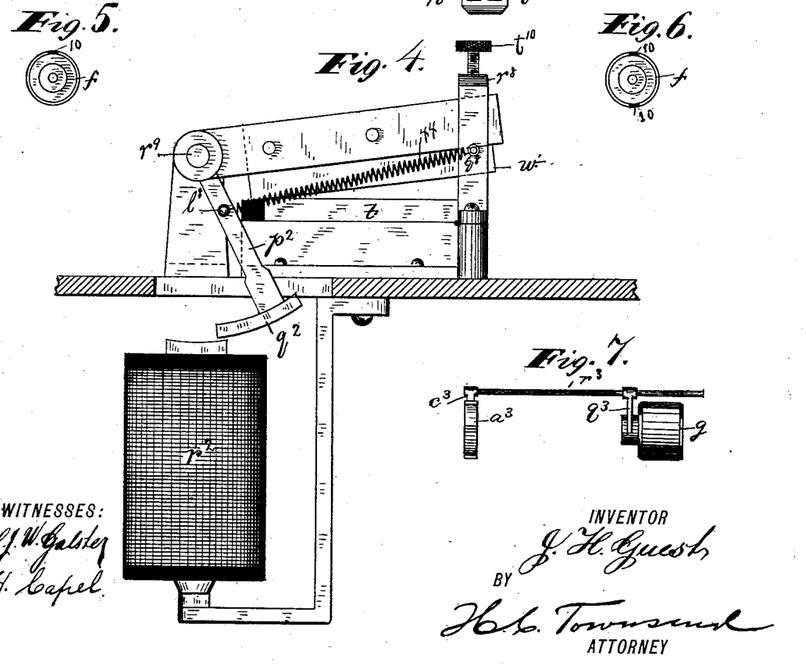
Fig. 4 is an elevation of a knife and operating-magnet whereby the printed strip is cut into separate tickets.
Fig. 5 is a side elevation of a wheel for printing one denomination of ticket.
Fig. 6 is a side elevation of a wheel for printing a ticket of higher denomination.
Fig. 7 is a plan of a detail of construction.
Figure 8:
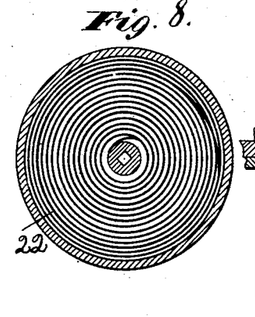
Fig. 8 is a side elevation of the mainspring-barrel.

The mechanism for separating the strip or strips of paper may be of any desired construction; but I prefer to employ a cutter, $w$, carried by an armature-lever, $p^2$, for an electro-magnet, $r^2$, as shown in Fig. 4, and working in conjunction with a fixed knife, $t$, secured to the end of the table $a$ after the manner of a pair of shears. The armature for the electro-magnet is indicated at $q^2$, (see Fig. 4,) and moves transversely to the curved pole-face of the electro-magnet $r^2$, as shown, so as to give a considerable range of movement. The distance of the knife $t$ from the printing-rolls is such that the cut will be made between the designs or imprints, making distinct tickets or checks. Suitable stops, $t^{10}$, and retractors 44 are provided for the cutting apparatus, as indicated in Fig. 4.

I prefer to work the electro-magnet $r^2$ and to do the printing by connections from the same line-circuit, 2 2, and in order to control properly the action of the knife and of the printing devices I employ a switch, $k^2$, that operates between stops $l^2\ m^2$, and that is provided with springs $o^2\ n^2$, making contact, respectively, with said stops in two positions of the switch. These stops are insulated from one another and the lever $k^2$ is suitably insulated from the frame-work and from the metallic portions of the driving mechanism for the wheels. This switch is a continuity-preserving switch—that is to say, is so arranged that connection shall be made with one stop before connection is broken with the other. The positive wire of circuit 2, coming from generator D, is connected to the lever $k^2$, (see Fig. 20,) and the stop $m^2$ is connected to the frame-work, and so to the spindle $b^2$ and to the wheels $f f f^3$. The support for wheels $g g$ is connected with the negative wire of circuit 2 2, and through the registers $E^2$ E with the central office and the generator D. (See Fig. 20.) The stop $l^2$ is connected with the electromagnet $r^2$, and thence with a second return-wire leading to the central office and the generator D. These connections are clearly shown in the diagram, Fig. 20.

Figure 10:
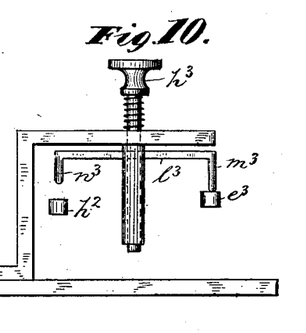
Fig. 10 is an elevation of the push-button whereby the printing mechanism is set into operation.
Figure 11:
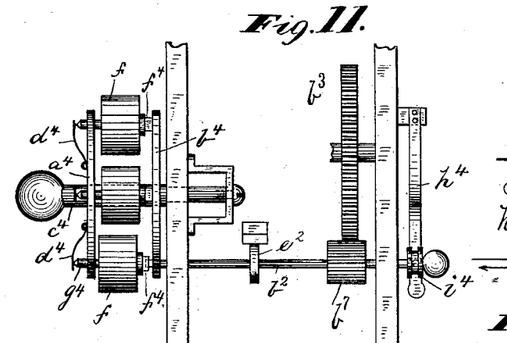
Fig. 11 is a plan of a modified construction in which the printing-wheels are mounted in a movable frame.
Figures 12, 16:
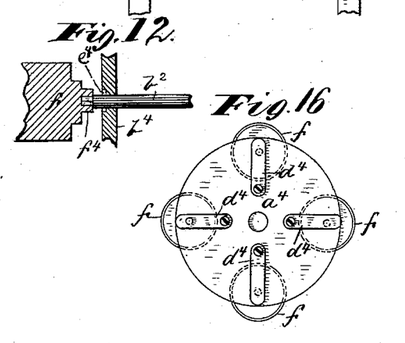
Figs. 12, 13, 14, 15, 16, 17, and 18 illustrate details of construction of the apparatus shown in Fig. 11.
Figure 13:
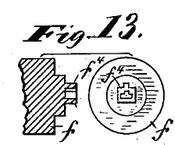
Figure 14:
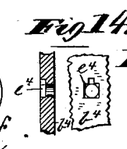
Figure 15:
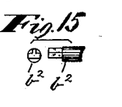
Figure 17:
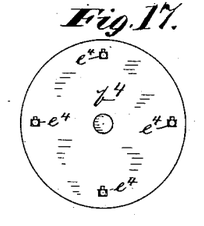
Figure 18:
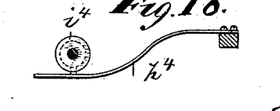

In the several connections or branches, including, respectively, the printing devices and the operating-magnet for the knife, are the two switches $o^3 p^2$, that are placed as shown simply for convenience in controlling the action of the devices independently of the switch-lever $k^2$. These switches might be omitted. The switch $k^2$ and the detent-lever $f^2$ are controlled by a push-button, $h^3$, Figs. 2, 3, and 10, whose stem carries the arms $l^3$, having downwardly-turned ends $n^3 m^3$, adapted to engage with levers $h^2 e^3$ at different points in the downward movement of the push-button. The lever $e^3$, or that upon which the push-button first acts, has its end covered with an insulating-plate, 30, where it engages with an arm, $i^2$, extending from the switch-lever $k^2$. The depression of the push-button will obviously throw the switch-lever $k^2$, so as to break circuit at the stop $l^2$ and to make circuit at stop $m^2$.

The lever $h^2$ is connected by a link, $g^2$, with the stop-arm $f^2$ in such manner that the depression of the button $h^3$ will obviously release the wheel $e^2$, so that the shaft $b^2$ may revolve and carry with it the printing-wheels. An arm, $g^3$, extends transversely from lever $h^2$ beneath that end of lever $e^3$ that operates upon the switch-lever.

Figures 24, 25, 26, 27:
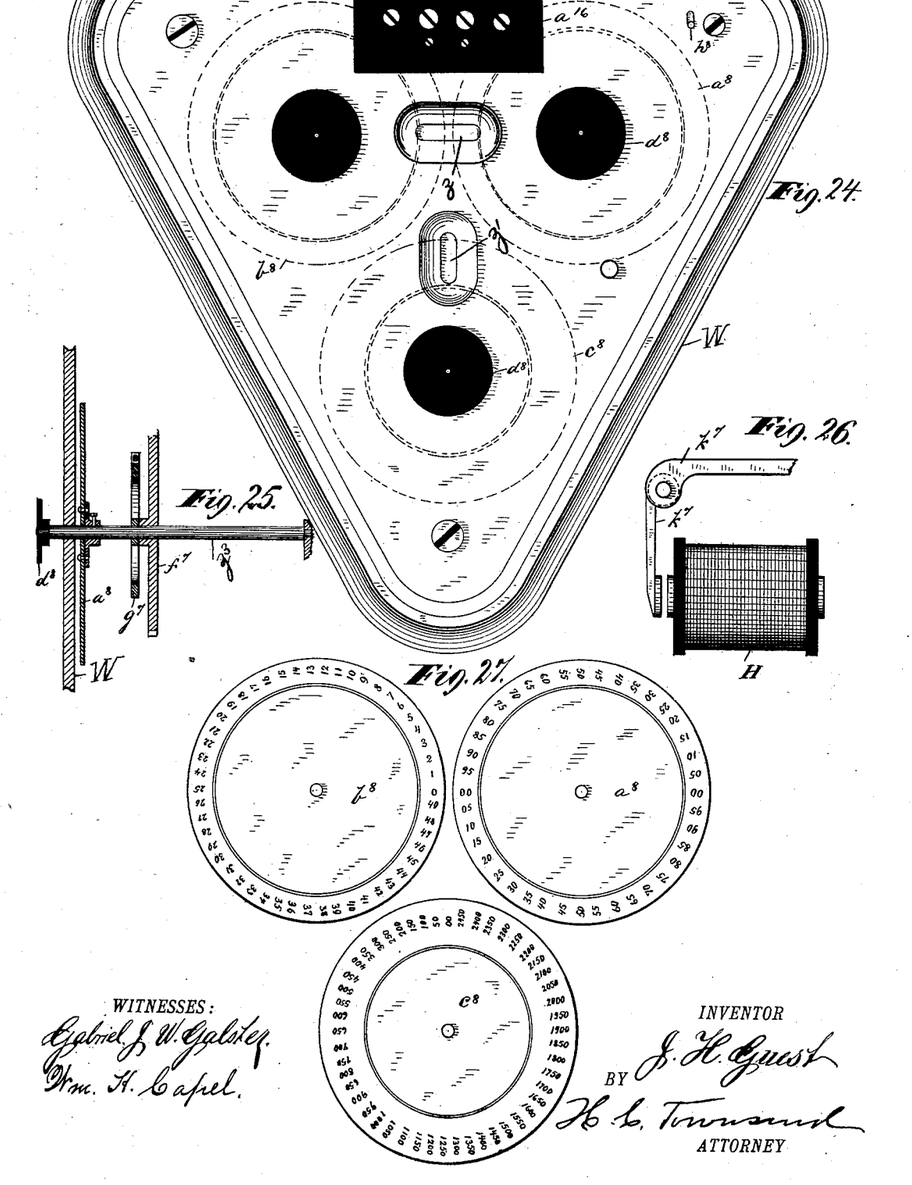
Fig. 24 is a plan of the electric register.
Fig. 25 is a longitudinal section through one of the dials and operating-wheel of the register.
Fig. 26 is a side view of a portion of the register.
Fig. 27 is a plan of the indicating-dials.
Figure 29:
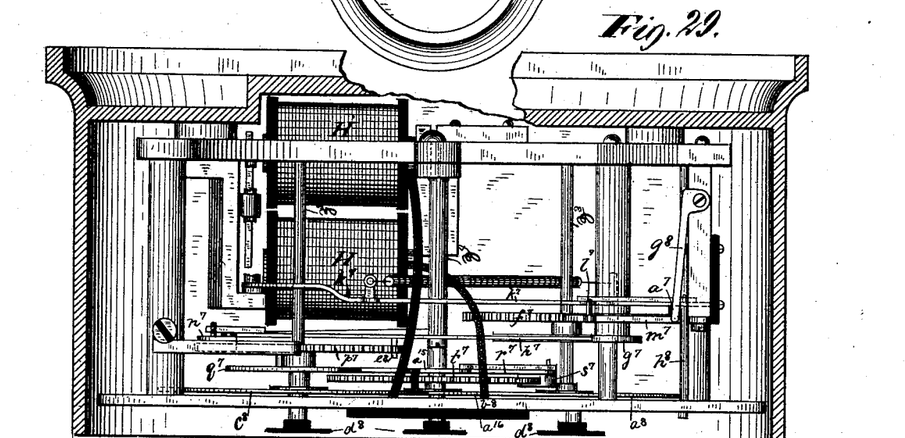
Fig. 29 is a side elevation of the register mechanism inverted.

The registers may be of any desired form or character adapted to be operated by electricity. A construction which I prefer to employ is shown in Figs. 24 and 29.

Figure 28:
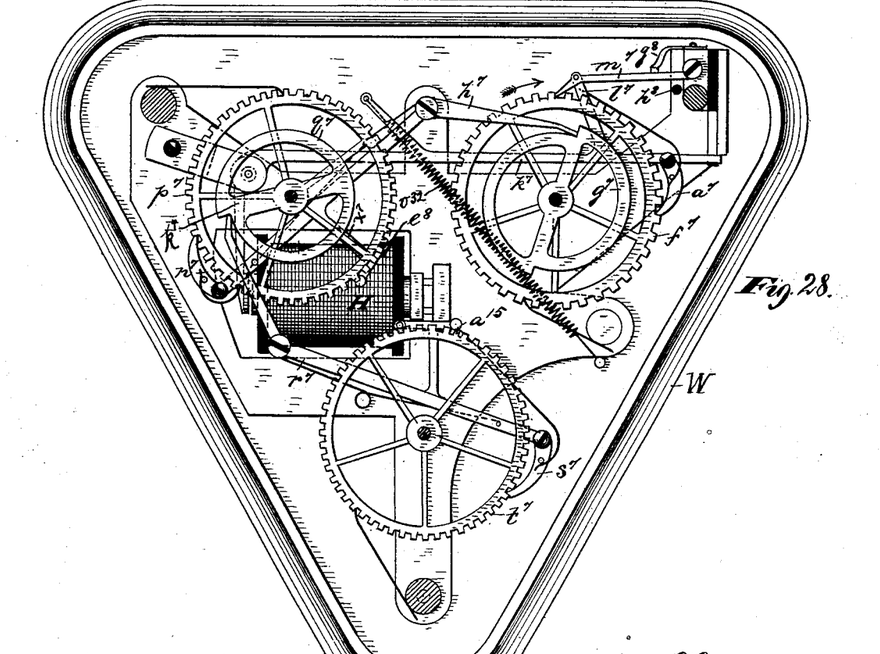
Fig. 28 is a plan of the register mechanism.

The casing of the apparatus is indicated at W, and said casing is preferably provided with a solid cover or door, the keys of which are in the control of some person in authority. The indications of the register are shown by means of three disks, $a^8 b^8 c^8$, which are suitably graduated at or near their periphery and are exposed to view through narrow slits or openings $z z'$. (Shown in plan, Fig. 24.) The units-wheel, or what may be called the "units-disk" in this instance, is the disk $a^8$, and for ordinary purposes it is graduated, taking five cents as the unit of its indications. The graduations run from five cents to one dollar, and the dollar-mark is indicated by the two ciphers which appear twice in the circumference of the disk, indicating that a complete revolution thereof would correspond to forty five-cent fares. Every half-revolution of the disk indicates one dollar in fares received, and this indication is "carried," as it is technically called, to the disk of the next higher denomination, which is graduated to indicate dollars from one to fifty. The disk $c^8$ is graduated to indicate fifty dollars and multiples thereof up to twenty-five hundred. Movement is communicated to the units-disk $a^8$ by means of an impelling-pawl, $a^7$, Fig. 28, which operates upon a toothed wheel, $f^7$, having forty teeth. The disk $a^8$ is fixed to the shaft $z^3$, upon which the wheel $f^7$ is secured, and more clearly indicated in Fig. 25, and the pawl $a^7$ is carried by a bent lever, $k^7$, which is the armature-lever of an electro-magnet, H, suitably mounted in the frame-work of the apparatus. Any ordinary retaining-pawl is applied to the wheel $f^7$ to prevent backward movement thereof, and a forward movement of the wheel of more than one tooth when the pawl $a^7$ acts is prevented by means of a locking-pawl, $m^7$, that is carried upon a post of the frame-work and is normally impelled toward the wheel $f^7$ by a spring, $g^8$. This pawl is normally in engagement with wheel, but is lifted by means of an arm, $l^7$, projecting from a lever, $k^7$, out of engagement therewith on the backward movement of the pawl $a^7$ to take hold of a fresh tooth, and remains out of engagement until the lever $k^7$ has made a sufficient movement in the direction to impel the wheel to cause the same to move one tooth, when the arm $l^7$ allows the pawl $m^7$ to engage with a tooth and prevent further movement. The pawl $m^7$ may be removed from engagement with the wheel by means of a flexible rod or stud, $h^8$, fixed at one end in the frame and projecting at its opposite end through the top plate, as shown in Figs. 24 and 29, so that when the cover is removed the pin or stud may be moved to one side to engage with the locking-pawl $m^7$ and remove it from engagement with wheel $f^7$. The stud $h^8$ is made use of when the register is to be reset to zero. The disks $b^8$ and $c^8$ are mounted upon suitable arbors, $z^3 z^4 z^5$, similarly to the disk $a^8$.

Toothed wheels secured, respectively, to their arbors are indicated at $p^7$ and $t^7$. Movement forward of the wheel $p^7$ at the completion of every half-revolution of the wheel $f^7$ is produced by the carrying-lever $h^7$, carrying at one end an impelling-pawl, $n^7$, that works against the teeth of the wheel $p^7$, and having its other end engaging with a double cam, $g^7$, or one having two stops, that is secured to the arbor of wheel $f^7$, so as to move with the latter. The direction of revolution of the wheel $f^7$ being that of the arrow, Fig 28, it is apparent that, starting from the position shown, the right-hand end of lever $h^7$ will be gradually raised on the cam-surface, so as to move the pawl $n^7$ back to engage with a fresh tooth of wheel $p^7$. When the right-hand end of the lever slips off the end of the cam to begin a new movement from the inner or lower end of the other cam, the pawl $n^7$ moves wheel $p^7$ forward one tooth. The "carrying" movement occurs, as before stated, twice in the whole revolution of the wheel $f^7$, since a whole revolution of the latter represents two dollars.

The disk $a^8$ is mounted in such position that the zero or dollar indication will appear at the end of the movement which permits the arm of lever $h^7$ to escape from the highest portion of the cam and to "carry" to the next wheel. A similar carrying device, working upon a wheel, $t^7$, consists of lever $r^7$, pawl $s^7$, carried thereby, and a cam, $q^7$, that moves with the wheel $p^7$. The latter cam has but one step, and the wheel $p^7$ has fifty teeth, inasmuch as the unit of the indications of the disk $c^8$ is fifty dollars.

A device similar to the pawl $m^7$ is applied to wheel $p^7$ to prevent overmovement of the same under the action of the impelling-pawl $n^7$. Such device consists of a locking-pin, $e^8$, which is carried upon the arm $x^7$, extending from the arm of lever $h^7$, that carries the pawl $n^7$.

The locking device $e^8$ is so arranged as to come into engagement with the teeth of wheel $p^7$ at the moment that the lever $h^7$ makes an impelling movement through the action of its spring sufficient to carry the pawl $n^7$ to such distance as to move the wheel $p^7$ one tooth. A similar device is mounted upon a locking-pin, $a^{15}$, projecting from lever $r^7$ and arranged to engage with the teeth of wheel $t^7$ and prevent overmovement of the latter under the action of its impelling-pawl $s^7$.

In order to reset this register to zero, the disengaging-pin $h^8$ should be moved to one side, so as to remove the pawl $m^7$ from engagement with the units-wheel, and the latter should then be turned forward by a knob, $d^3$, on the outer end of the spindle $z^3$, carrying the wheel, until the lever $h^7$ has been brought to the highest point on one of the cams, $g^7$, or, in other words, to a point where the disk $a^8$ will show the figures 95 through the opening $z$ in the face-plate. The lever $h^7$ is by this means brought to a position where the locking-pin $e^8$ will be out of engagement with wheel $p^7$, and the latter may then be turned forward by a button, $d^3$, secured to the outer end of its shaft $z^5$, until the lever $p^7$ reaches the highest point of cam $q^7$, or, in other words, a point where the disk $b^8$ shows the figures 49 through the opening in the face-plate. The locking device carried by lever $r^7$ is by this means raised to a position where it will be free from engagement with wheel $t^7$, and the latter may then be turned forward in a similar way until the disk $c^8$ shows 2450 through the face-plate. By then turning the disk $a^8$ and wheel $f^7$ forward one step the lever $h^7$ drops off the end of the cam, thus moving the wheel $p^7$ forward one tooth and permitting the lever $r^7$ to escape from the upper or highest portion of the cam $q^7$ and to move the wheel $t^7$ one tooth. These movements of the several disks result in carrying them to the zero point or position, where they will all show zero through the openings in the face-plate. The disengaging-rod $h^8$ having been allowed to resume its normal position, the apparatus is in condition to register the number of electric pulsations flowing in the coils of electro-magnet H. Such electro-magnet being connected as already explained, in the various circuits, the several registers will indicate the amount of five-cent checks delivered and deposited.

Where the register is designed to indicate only the amount of ten-cent checks deposited or delivered, it is only necessary to change the indications on the dial $a^8$ to indicate ten and multiples of ten up to one dollar, the indications being four times repeated on the circumference of the disk, and the cam $g^7$ having four instead of two stops. Electric connection is made with the electro-magnet H in any desired way—as, for instance, through binding-screws mounted on a plate, $a^{16}$, of insulating material, fixed to the outer plate of the frame carrying the working parts of the register.

The operation of the apparatus is as follows: Normally, by means of a suitable retractor, the switch $k^2$ is held in position where circuit will be closed through stop $l^2$ and the printing-magnet $r^2$, so that the knife $w$ will be held down and would obstruct the feeding of the paper across the table $p$ from beneath the wheels $f$. If the button $m$ be depressed and held by a suitable catch, the wheel $g$ beneath the inner of the two wheels $f$, which may be considered as the wheel for printing five-cent checks, will be pressed upward by the action of the spring $k$, and the paper strip between the wheels will be held firmly between them, so that an electric current may pass from the upper to the lower of the two wheels, and, when said wheels are revolved, may by its decomposing action discolor the strip in the design formed upon the surface of the wheel $f$. The other buttons, $m$ and $n$, being raised, as shown in Fig. 9, the rollers $g$ beneath the other wheel $f$ and wheel $f^3$ will drop down or will be depressed, so that the paper strips fed over said wheels will fall away from the printing-wheels and there will be no opportunity for a circuit to pass through them when the apparatus is permitted to operate. It is of course to be understood that the mechanism connected to the buttons $m$ $m$ is preferably out of reach of the operator, so that it is impossible for him to print from both wheels $f$ at once. This result arises from the fact that the depression of one of the buttons, or either of them, to raise its wheel $g$ will, through the lever $d^3$, depress the other wheel.

The wheels for printing five and ten cent checks, respectively, as before stated, and as shown in Figs. 5 and 6, are provided at certain points in their periphery with insulating-spaces 10 10, adapted to interrupt the circuit as it passes through the wheel in the operation of printing a check or ticket. The wheel for printing a five-cent check is provided with one insulating-space, and the wheel for printing ten-cent checks with two insulating-spaces. In the case of the latter wheel these spaces are preferably at diametrically-opposite points. In the position of rest of the wheels the insulating-spaces are at the points in the periphery of the wheels where they rest upon the paper, so that when a wheel $g$ presses the paper against the wheel $f$ and the apparatus is at rest or in normal position there will be no circuit through said wheels until they begin their revolution, and when they come to rest at the end of a complete revolution the circuit will be broken.

It will of course be understood that when tickets of higher denomination are to be printed the wheels for printing such tickets or checks are provided with a correspondingly greater number of insulating-spaces. On depressing the button $h^3$ the first effect is to operate the lever $e^3$, thus breaking the circuit through the magnet $r^2$ and permitting the retractor for the armature-lever to withdraw the knife $w$ out of the way of the strip of paper, so as to permit the latter to be fed across the table from between the wheels. Immediately after this action the lever $h^2$ is operated and the driving devices are released and the wheel $e^2$ begins to revolve. Simultaneously with the release of the wheel the circuit is closed at the stop $m^2$, so that the moment the wheels $f g$ have revolved sufficiently far to close the circuit through themselves current will flow on the whole circuit and through the electro-magnets of the registers E E$^2$. Said latter electro-magnets, operating on their armature-levers, move the pawls of the units-wheels into position to take a fresh hold on the ratchets, so that on the interruption of the circuit the units-wheels will be moved forward one tooth. As the wheels $f g$ revolve, drawing the paper between them, the current in its passage discolors the paper in the design of the upper wheel, and if the pressure on the button $h^3$ has been relieved, which would ordinarily be the case if a single ticket is to be delivered, the circuit will be again interrupted when the wheel reaches its normal position, with its insulating-space in contact with the paper. This interruption of circuit will not, however, occur immediately on relief of pressure upon the button $h^3$—that is to say, such relief will not break the circuit at $m^2$ until the wheel has completed its revolution—because the lever $k^2$ will be held over through the supporting action of the lever $f^2$, whose detent-pin rests upon the unbroken periphery of the detent-wheel $e^2$ and holds up the arms $i^2$ through the projecting arm $g^3$, that extends from lever $h^2$ beneath the lever $e^3$, as shown more clearly in Fig. 3. When, however, the printing-wheel reaches its normal position, the parts come to rest and the circuit is immediately interrupted, both at stop $m^2$ and at the insulating portion of the wheel, thus permitting the retractors $o^{32}$ $o^{32}$ of the register-levers $k^7$ $k^7$ to throw the operating-pawls $a^7$ $a^7$. Should, however, the operator desire to print and deliver a number of five-cent checks, it is only necessary for him to hold the push-button $h^3$ down, thus holding up the detent-lever $f^2$, and also keeping the switch-lever $k^2$ against its stop $m^2$ and preserving the circuit through the printing devices. He may hold the push-button down as long as he pleases, but at every whole revolution of the printing-wheel, and for every ticket printed, there will be an interruption of the circuit at the insulating portion of said printing-wheel, and there will be evidently as many operations of the registers as there are tickets printed. As the lever $k^2$ returns to its normal position under the action of its spring when the detent-lever $f^2$ brings the mechanism to rest, the circuit will be closed at stop $l^2$ again through the magnet $r^2$, and the latter will operate the knife so as to cut the printed strip on a line between two consecutive tickets. The ticket or tickets thus detached drop into a suitable hopper, or into suitable position where they may be obtained.

When the operator desires to print ten-cent checks, he depresses the right-hand button $m$, Fig. 9, thus raising the paper and the lower wheel $g$ into contact with the wheel for printing ten-cent checks or tickets, and simultaneously permitting the paper to fall away from contact with the five-cent printing-wheel. On the operation of the button $h^3$ the action already described takes place, with the exception that there is an additional break and make of circuit produced by the second insulated space on the ten-cent wheel, thus giving two operations of the registers.

If it be desired to deliver, for instance, twelve ten-cent checks for a dollar and to produce the proper number of operations of the register—to wit, twenty—the button $n$ is operated. In this case it is obvious that, unless some special provision be made, twelve revolutions of the printing-wheel $f^3$ (inasmuch as it is designed for printing ten-cent checks and has two insulating-spaces) would produce twenty-four operations of the registers and would give a total indication on the latter of one dollar and twenty cents.

In order that the registry may be a dollar, I provide an automatic electric switch that shall complete the circuit automatically at four of the times when, without the presence of such switch, the wheel $f^3$ would interrupt the circuit. A device for this purpose is shown more clearly in Figs. 1, 2, 7, and 21. On the wheel $g$ beneath the printing-wheel $f^3$ is a conducting hub or surface, upon which a conducting-arm, $q^3$, may bear when said wheel is lifted for the purpose of printing from wheel $f^3$. The arm or lever $q^3$ operates as a switch for completing a shunt around the wheel $f^3$ at four of the times when an insulating-space on the latter rests upon the paper. Normally or at the start, when the wheel $g$ is lifted, the arm $q^3$ is out of contact with the conducting-hub. This result is accomplished by mounting the arm $q^3$ on a rock-shaft, $r^3$, to another portion of which is secured an arm, $c^3$, having a pin or point that bears against the periphery of a wheel, $a^3$, secured to the shaft of wheel $b^3$. The periphery of this wheel is cut away at four points, as indicated in the diagram, Fig. 21, and whenever one of these depressions registers with the pin on the arm $c^3$ a spring, 20, draws the lever $q^3$ down into contact with the hub of wheel $g$. (See Fig. 21.) At other times the lever $q^3$ is held up by the unbroken portion of the periphery of wheel $a^3$.

The gear of the driving-wheel $b^3$ and the pinion secured to the shaft $b^2$ are so proportioned that the wheel $b^3$, and therefore wheel $a^3$, shall make one complete revolution for the twelve revolutions of the shaft $b^2$ necessary for printing the twelve tickets by the operation of the printing-wheel $f^3$, and the depressions in the wheel $a^3$ are so placed as to allow the wheel $q^3$, as just described, to make contact with the hub of the lower wheel $g$ at the time that an insulating-space of wheel $f^3$ rests on the paper. There being four such depressions, it is obvious that four of the interruptions of circuit that would be produced by wheel $f^3$ in printing its twelve tickets will be bridged, by reason of the fact that, as indicated in Fig. 21, the switch-arm $q^3$ is connected to the same portion of the circuit as wheel $f^3$—that is, for instance, to the frame-work—and that it will at such times complete a shunt around wheel $f^3$. Any other switching device would be suitable for the purpose, provided it should be properly arranged to close the circuit and bridge the break at four of the periods when the wheel $f^3$ would otherwise break the circuit.

Instead of employing push-buttons $m$ $m$ and the connected devices for setting the apparatus to print checks or tickets of any desired denomination, I prefer to employ a number of printing-wheels having different designs and mounted upon a movable support, which may be turned or moved to bring any desired wheel into proper position to be mechanically engaged with the driving mechanism. Such a device is shown in Figs. 11 to 18, inclusive.

The wheels $f$, each bearing a surface adapted to print a check or ticket of different character, are mounted on a movable support consisting of two disks or plates, $a^4$ $b^4$, secured to a shaft or spindle, $c^4$, by which any one wheel may be brought to position, so that its shaft or spindle will register with the driving shaft or spindle $b^2$. The spindles for the wheels are capable of a slight longitudinal movement in the supporting-disks and are pressed by means of the springs $d^4$, bearing against the ends of the spindle, toward the support $b^4$. At points $f^4$, or at their ends, the spindles are made square or of proper configuration on their exterior to fit into correspondingly-formed depressions $e^4$ in the support $b^4$. (See Fig. 14.) In the ends of the spindles are formed square or other openings, with which the square or otherwise-formed end of the shaft $b^2$ may engage for locking the wheel to the driving mechanism. The shaft $b^2$ is also given a slight longitudinal play and is normally held in position for driving one of the wheels by means of a spring-catch, $h^4$, that carries a pin engaging with the grooved disk $i^4$ on the shaft.

By depressing the spring $h^4$ the shaft may be moved backward a slight distance out of engagement with the spindle of the wheel $f$. The spring $d^4$ presses the spindle against the plate or support $b^4$, and its end becomes seated in the depression in said plate, so that the wheel cannot be accidentally turned, and when it is again brought into position for use it will stand with its insulating-space in proper position. The pinion on the shaft $b^2$, by means of which it is driven, is somewhat elongated, to permit longitudinal movement without disengagement of the gear. After disengaging the shaft $b^2$, through moving it longitudinally backward, from any printing-wheel $f$, the support for said printing-wheels may be moved to bring any particular wheel into position to engage with the shaft in an obvious manner.

Figure 19:
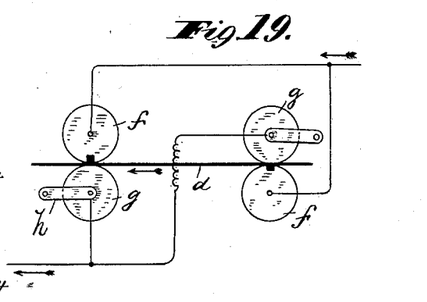
Fig. 19 illustrates diagrammatically an arrangement for printing both sides of the strip or ribbon.

It is sometimes desirable to print both sides of the strip $d$ simultaneously. It is obvious that this cannot be accomplished with but one set of printing-surfaces $f$ $g$, inasmuch as the paper is discolored only on that side which comes in contact with the positive pole of the circuit. In order to print both sides I may use two sets of wheels, each bearing an appropriate design and arranged as indicated in Fig. 19, the connections through the sets being reversed and the position of the printing-wheels being also reversed, as shown, so that in one case the current shall pass up and in the other it will pass down through the strip of paper.

I have described the printing-wheel as arranged with its insulated portion normally in position opposite the paper, so that at the beginning of the operation the circuit is broken. It might, however, be arranged so that the insulating portion of the wheel should be in such position that the circuit will be closed through the paper at the moment that the switch $k^2$ completes the circuit to the wheel. This is illustrated in Fig. 22. When this arrangement is employed, the use of a separate return-circuit for the knife-operating magnet $r^2$, as shown in Fig. 20, becomes unnecessary, and said magnet might be connected—as, for instance, by a wire (indicated in dotted lines at 17)—directly with the return-circuit, including the registers $E^2$ E. Under this arrangement the magnets of the registers would be normally energized, and when the switch is operated to complete circuit at $m^2$ said magnets would still be energized, because the switch would make contact at $m^2$ before breaking contact at $l^2$, and because, further, the circuit would be intact through the wheels $f$ $g$ when the wheels $f$ $g$ revolve, and the circuit will be broken when the insulating spaces on the wheel come around to position opposite wheel $g$, thus permitting the spring of the armature-lever in the register to throw the units wheel one notch. The circuit is immediately recompleted as the wheels revolve and remains completed when they come to rest. When the switch $k^2$ resumes its normal position, no interruption of the circuit is produced and the magnet of the register remains energized ready for the next operation.

I do not limit myself to the employment of the two registers E E², and the register E² at the ticket-office might be dispensed with, or the same might be retained and the use of the registers at a central office dispensed with. Any generator of electricity may be employed, and the printing and operation of the registers may be effected by the same or by separate generators, as may be found convenient. It is obvious, likewise, that the cutting or separating device might be actuated by any mechanism desired. I prefer, however, to employ the electro-magnet.

The circuit-controller for producing the desired operations of the register might be formed by the employment of a circuit-closing wheel independent of the printing-wheel. Said circuit-closing wheel might be in the same circuit with the printing-wheel or might be a branch around them. The latter arrangement could be employed when the register is to be placed at the same station with the printing apparatus. I have shown such an arrangement in Fig. 30. The wheel $a^{20}$ is mounted on the shaft $b^2$, but properly insulated therefrom, and a spring, $b^{20}$, closes the circuit through the wheel a number of times corresponding to the value of the check or ticket. This is effected by providing the wheel $a^{20}$ with circuit-closing teeth 14 14. A spring bearing against the face of the wheel carries the circuit through it independently of the printing devices.

Figures 23, 30:
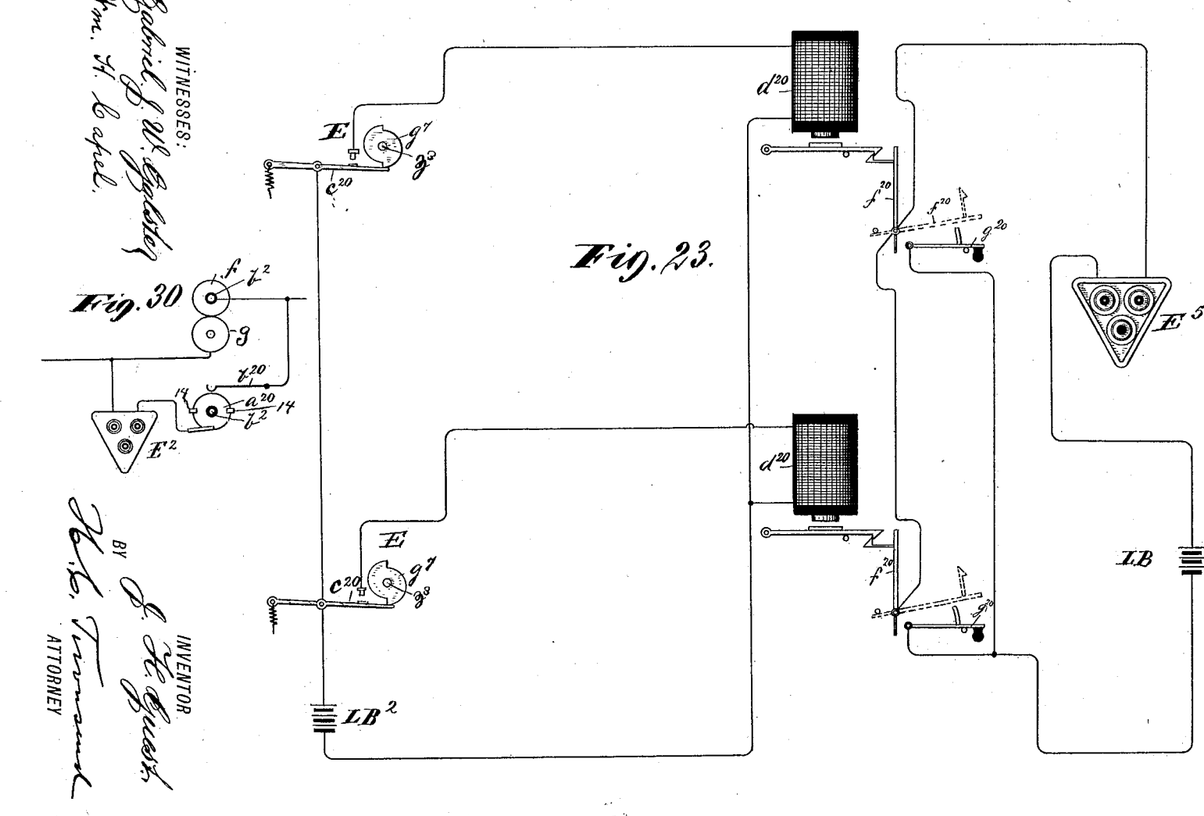
Fig. 23 is a diagram illustrating an arrangement of apparatus to be employed at a central office.
Fig. 30 is a diagram illustrating a modified arrangement of circuits.

It is sometimes desirable to keep a total register of the operation of a number of separate registers located at a central office and connected each with a separate ticket printing and delivery apparatus. An arrangement suitable for this purpose is indicated in Fig. 23. Cam-wheels upon the units-shafts $z^3$ of two separate registers E are indicated at $g^7$. Each cam operates upon the circuit-closing lever $c^{20}$, which closes the circuit of an annunciator-magnet, $d^{20}$, through a battery, L B², as soon as the register has counted a dollar. The annunciator-magnets each have a flap or indicator, $f^{20}$, of any desired form or construction, and are each provided with a resetting mechanism or handle, $g^{20}$, for throwing the flap or indicator back to normal position after it has been released. The resetting devices $g^{20}$ are under the control of an attendant, whose duty it is to reset the annunciators as they may from time to time be operated.

In the resetting operation the circuit of the local battery L B is closed through a register of totals, E⁵, which is graduated to indicate dollars. The circuit is completed through contact of the resetting-handle $g^{20}$ with a flap or indicator and from the latter through the detent of the annunciator-magnet in an obvious manner. It will be obvious that by this means the register E⁵ may be made to show the total registry of the operations of a number of registers E. Any kind of annunciator and any kind of resetting mechanism might be employed for the purpose, those shown being merely typical of such devices.

What I claim as my invention is—

1. In a combined check or ticket printing and delivering apparatus substantially such as described, the combination, with an electro-chemical printing device, of a governing or controlling device for the printing mechanism, a means for delivering the checks or tickets as printed at the point where the governing device for the printing mechanism is located, an electric register having an operating electro-magnet in the circuit which includes the printing-surface and the check or ticket, and circuit breaking or controlling devices in said circuit, as and for the purpose described.

2. The combination, with an electro-chemical printing apparatus having its printed surface divided electrically, of a register controlled by an electric circuit formed through said wheel or surface and the paper.

3. A check or ticket delivery apparatus having two or more printing wheels or surfaces for different characters of checks or tickets, said wheels having means for breaking and closing an electric circuit a different number of times, respectively.

4. In a check or ticket printing apparatus, two or more electro-chemical printing devices having their conducting-surfaces over which the paper passes subdivided, respectively, into insulated parts corresponding in number to the value of the ticket or check that each is adapted to print.

5. The combination, in a check or ticket printing and ticket-delivery apparatus, of a series of printing-wheels mounted on a movable table or carrier, a driving mechanism for operating said wheels to print a check or ticket, and means for connecting any wheel, when brought into printing position, with the said driving mechanism.

6. The combination, with the feeding and printing mechanism, of a magnetically-operated cutting or separating mechanism and an electric switch throwing the operating-magnet out of action when the feeding mechanism is set into operation to feed and print, as and for the purpose described.

7. The combination, with the check or ticket printing devices, of an operating mechanism for the feeding and printing devices, a detent or stop for normally holding said mechanism at rest, a cutting or separating mechanism, an operating electro-magnet for the latter, an electric switch controlling said magnet, and means for operating said switch and detent or stop together, as and for the purpose described.

8. The combination, with the electro-chemical printer and the cutting or separating mechanism and its operating-magnet for dividing the printed strip, of an electric switch controlling in its two opposite positions said magnet and the circuit through the electro-chemical printer, respectively.

9. The combination, with the register, of an electric annunciator or indicator, and circuit-closer for automatically throwing the latter into action when the register has been operated a predetermined number of times.

10. The combination, with the two or more registers, of an annunciator or indicator for each register, a resetting mechanism for each indicator, and a register common to said resetting mechanisms and controlled thereby, as and for the purpose described.

11. The combination, with the registers in the two or more separate circuits, of an annunciator or indicator operated by such after a predetermined registry, and resetting mechanisms for the indicators, each controlling a circuit for an electric register common to them all, as and for the purpose described.

12. In an apparatus for printing tickets or checks electro-chemically, a circuit-breaker placed in the printing-circuit and arranged to interrupt the current in the progress of printing a number of times corresponding to the value of the check or ticket printed.

13. In a check or ticket delivery apparatus, an electro-chemical printing device having two sets of printing-surfaces through which electric current is carried reversely, as described, so as to print both sides of the check or ticket.

14. The combination, with the circuit-controlling devices for operating on the circuit a number of times corresponding to the number of tickets or checks printed or delivered, of a shunt-circuit closer for completing the circuit a predetermined number of times coincidently with the operation of the circuit-controller, so as to render the latter ineffective.

15. The combination, with the ticket-printing apparatus and circuit-controlling devices operating therewith to produce a registry of the number of tickets printed, of a shunt-circuit closer operated by the mechanism a predetermined number of times for a given number of tickets printed or delivered, as and for the purpose described.

16. The herein-described method of preventing the use of fraudulent tickets or checks employed for the purpose described, consisting in printing the check or ticket with a fugitive or transient imprint adapted to endure approximately only for the time between the delivery of the check or ticket from the ticket printing and delivery apparatus and the final deposit of said check or ticket in the closed or locked receptacle provided for the same, as and for the purpose set forth.

17. The combination, with an electro-chemical printing device and a controlling mechanism therefor placed at one station, of an electric register at another station, a generator at a point out of the control of the operator, an electric circuit including the printing-surfaces and the electric register, and an electric-circuit breaker or controller connected to said circuit and actuated by the mechanism of the printing device, as and for the purpose described.

18. The combination, with an electro-chemical printing apparatus, of an electric register included in the circuit which passes through the printing-surfaces, and a circuit-breaker operated by the printing apparatus for breaking the electric circuit and simultaneously with each printing operation, as and for the purpose described.

19. In a combined ticket printing and delivery apparatus, the combination of an electro-chemical printing device, a governing or controlling device for the printing mechanism, means for delivering the tickets as printed at the station where the controlling device is located, an electric register included in the electric circuit over which the decomposing-current flows, and a circuit-controller on said circuit connected with the mechanism of the ticket printing and delivery apparatus, so as to be actuated thereby.

20. The combination, in a ticket printing and delivery mechanism, of a printing-wheel, a blank strip, means for feeding said strip beneath the wheel, a controlling mechanism, a cutting or severing device, an actuating-magnet, and a circuit breaker or maker for the circuit of the latter governed by said controlling mechanism, as and for the purpose described.

Signed at New York, in the county of New York and State of New York, this 15th day of February, A. D. 1886.

J. H. GUEST.

Witnesses:
 WM. H. CAPEL,
 GEO. C. COFFIN.